(12) United States Patent
Jussel et al.

(10) Patent No.: US 12,045,984 B2
(45) Date of Patent: Jul. 23, 2024

(54) COMPARISON OF COLOR IMAGES OF THREE-DIMENSIONAL DENTAL STRUCTURES

(71) Applicant: Ivoclar Vivadent AG, Schaan (LI)

(72) Inventors: Rudolf Jussel, Feldkirch-Gisingen (AT); Christian Niedrig, Azmoos (CH); Hendrik John, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 91 days.

(21) Appl. No.: 17/475,402

(22) Filed: Sep. 15, 2021

(65) Prior Publication Data

US 2022/0114728 A1    Apr. 14, 2022

(30) Foreign Application Priority Data

Oct. 13, 2020 (EP) .................................... 20201553
Dec. 21, 2020 (EP) .................................... 20215936
Dec. 21, 2020 (EP) .................................... 20215943
Dec. 21, 2020 (EP) .................................... 20215945

(51) Int. Cl.
*G06T 7/00* (2017.01)
*A61C 9/00* (2006.01)
(Continued)

(52) U.S. Cl.
CPC ............ *G06T 7/0014* (2013.01); *A61C 9/004* (2013.01); *A61C 9/0053* (2013.01); *A61C 13/0004* (2013.01); *A61C 13/0019* (2013.01); *A61C 13/082* (2013.01); *A61C 13/09* (2013.01); *A61C 13/34* (2013.01); *A61C 19/10* (2013.01); *B29C 64/386* (2017.08); *B33Y 50/00* (2014.12); *B33Y 80/00* (2014.12); *G06F 30/10* (2020.01); *G06T 3/40* (2013.01); *G06T 5/70* (2024.01); *G06T 7/0012* (2013.01); *G06T 7/344* (2017.01);
(Continued)

(58) Field of Classification Search
None
See application file for complete search history.

(56) References Cited

U.S. PATENT DOCUMENTS 6,726,476 B2 * 4/2004 Jung ..................... G01J 3/0218
433/29
7,234,937 B2 * 6/2007 Sachdeva ............... A61C 7/146
433/24
(Continued)

FOREIGN PATENT DOCUMENTS

CN            105167874 A      12/2015
DE            19922870 A1      12/2000
(Continued)

*Primary Examiner* — Randolph I Chu
(74) *Attorney, Agent, or Firm* — Ann M. Knab; Thad McMurray

(57) ABSTRACT

The present invention relates to a method for comparing three-dimensional dental structures, comprising the steps of acquiring (S101) a target data set representing the shape and optical properties of a natural tooth; rendering (S102) a digital tooth model (200) to generate an actual data set representing the shape and optical properties of the digital tooth model; determining (S104) a first comparison value from the actual data set; determining (S105) a second comparison value from the target data set; and determining (S106) a deviation based on the first and second comparison values.

15 Claims, 8 Drawing Sheets

(51) Int. Cl.

| | | |
|---|---|---|
| *A61C 13/00* | (2006.01) | |
| *A61C 13/08* | (2006.01) | |
| *A61C 13/09* | (2006.01) | |
| *A61C 13/34* | (2006.01) | |
| *A61C 19/10* | (2006.01) | |
| *B29C 64/386* | (2017.01) | |
| *B33Y 50/00* | (2015.01) | |
| *B33Y 80/00* | (2015.01) | |
| *G06F 30/10* | (2020.01) | |
| *G06T 3/40* | (2006.01) | |
| *G06T 5/70* | (2024.01) | |
| *G06T 7/33* | (2017.01) | |
| *G06T 15/00* | (2011.01) | |
| *G06T 15/08* | (2011.01) | |
| *B29L 31/00* | (2006.01) | |
| *G01J 3/50* | (2006.01) | |

(52) U.S. Cl.
CPC .............. *G06T 15/00* (2013.01); *G06T 15/08* (2013.01); *B29L 2031/7532* (2013.01); *G01J 3/508* (2013.01); *G06T 2207/10024* (2013.01); *G06T 2207/30036* (2013.01); *G06T 2210/41* (2013.01)

(56) References Cited

U.S. PATENT DOCUMENTS

| | | | | |
|---|---|---|---|---|
| 9,008,417 | B2* | 4/2015 | Rohner | G01J 3/02 382/165 |
| 9,662,188 | B2* | 5/2017 | Laubersheimer | A61C 13/0004 |
| 10,776,533 | B2 | 9/2020 | Fisker et al. | |
| 11,246,688 | B2* | 2/2022 | Salah | G06T 7/0012 |
| 11,324,570 | B2* | 5/2022 | Cinader, Jr. | A61C 7/00 |
| 11,382,720 | B2* | 7/2022 | Kopelman | A61C 7/002 |
| 11,633,268 | B2* | 4/2023 | Moalem | A61C 13/0004 433/203.1 |
| 2004/0038168 | A1* | 2/2004 | Choi | A61C 7/00 433/213 |
| 2006/0093986 | A1* | 5/2006 | Shoji | A61C 19/04 433/72 |
| 2008/0305451 | A1* | 12/2008 | Kitching | A61C 7/002 433/24 |
| 2008/0305453 | A1* | 12/2008 | Kitching | A61C 7/00 433/213 |
| 2008/0305454 | A1* | 12/2008 | Kitching | A61C 7/00 433/24 |
| 2008/0306724 | A1* | 12/2008 | Kitching | A61C 7/00 704/2 |
| 2010/0151404 | A1* | 6/2010 | Wu | A61C 7/00 433/24 |
| 2016/0135925 | A1* | 5/2016 | Mason | A61C 7/002 703/2 |
| 2016/0220200 | A1* | 8/2016 | Sandholm | A61B 5/7246 |
| 2017/0100208 | A1* | 4/2017 | Wen | A61C 7/002 |
| 2017/0325910 | A1* | 11/2017 | Salah | G06T 7/73 |
| 2018/0153409 | A1* | 6/2018 | Kopelman | A61C 7/002 |
| 2018/0235437 | A1* | 8/2018 | Ozerov | A61B 5/7264 |
| 2019/0090993 | A1* | 3/2019 | Engelmohr | G06T 7/0016 |
| 2019/0269485 | A1* | 9/2019 | Elbaz | A61B 1/00009 |
| 2019/0294743 | A1* | 9/2019 | Ajri | A61C 13/0004 |
| 2019/0318479 | A1* | 10/2019 | Ajri | G06T 7/0014 |
| 2019/0336254 | A1* | 11/2019 | Hasan | B29C 64/40 |
| 2020/0000551 | A1* | 1/2020 | Li | A61C 9/0053 |
| 2020/0051234 | A1* | 2/2020 | Ajri | G06T 7/596 |
| 2020/0306010 | A1* | 10/2020 | Aamodt | G16H 30/40 |
| 2020/0360109 | A1* | 11/2020 | Gao | G06T 7/0012 |
| 2020/0405452 | A1* | 12/2020 | Song | G05B 19/4097 |
| 2021/0007833 | A1* | 1/2021 | Rauh | A61C 19/10 |
| 2021/0259808 | A1* | 8/2021 | Ben-Gal Nguyen | G06N 3/088 |
| 2021/0366119 | A1* | 11/2021 | Salah | G16H 50/20 |
| 2022/0039918 | A1* | 2/2022 | Akopov | A61C 7/08 |
| 2022/0092230 | A1* | 3/2022 | Callan | G06F 30/20 |
| 2022/0110729 | A1* | 4/2022 | Glinec | G06T 7/30 |
| 2022/0151733 | A1* | 5/2022 | Liu | A61C 13/0004 |
| 2022/0265393 | A1* | 8/2022 | Phan | G16H 30/40 |
| 2022/0409342 | A1* | 12/2022 | Akselrod | A61C 7/08 |
| 2023/0000600 | A1* | 1/2023 | Wong | A61C 9/0053 |
| 2023/0132201 | A1* | 4/2023 | Chekh | G06V 40/161 345/419 |
| 2023/0138021 | A1* | 5/2023 | Wratten, Jr. | A61C 7/002 433/24 |

FOREIGN PATENT DOCUMENTS

| | | |
|---|---|---|
| EP | 3530232 A1 | 8/2019 |
| WO | 2019023461 A1 | 1/2019 |

\* cited by examiner

COMPARISON OF COLOR IMAGES OF THREE-DIMENSIONAL DENTAL STRUCTURES

CROSS-REFERENCE TO RELATED APPLICATIONS

This application claims priority to European Patent Application No. 20215936.4, filed on Dec. 21, 2020, European Patent Application No. EP 20201553.3, filed on Oct. 13, 2020, European Patent Application No. 20215943.0, filed on Dec. 21, 2020 and European Patent Application No. 20215945.5, filed on Dec. 21, 2020, the disclosures of which are incorporated herein by reference in their entirety.

TECHNICAL FIELD

The present invention relates to a method for comparing three-dimensional dental structures, a computer device for comparing three-dimensional dental structures, and a computer program.

BACKGROUND

For the lifelike fabrication of a dental restoration, it is necessary to precisely determine deviations in an appearance of the artificial dental restoration and a natural tooth of the patient. Only when deviations are precisely determined is it possible to adjust and fabricate the dental restoration in a way that it matches the appearance of the natural tooth.

EP 2 486 892 B1 and corresponding U.S. Pat. No. 9,662,188B2, which US patent is hereby incorporated by reference, describe how a virtual tooth's appearance on a calibrated screen is compared with the image of the neighboring tooth by a user to gain a realistic impression. If the result is not yet satisfactory, the layer thickness or translucency can be adjusted, for example. However, inaccuracies always occur when a user visually compares the results on the screen.

SUMMARY

It is the technical aim of the present invention to determine a reliable value for a deviation between a virtual tooth structure and an image of a natural tooth structure.

This technical problem is solved by subject-matter according to the independent claims. Technically advantageous embodiments are the subject of the dependent claims, the description, and the drawings.

According to a first aspect, the technical problem is solved by a method for comparing three-dimensional dental structures, comprising the steps of acquiring a target data set representing the shape and optical properties of a natural tooth; rendering a digital tooth model to generate an actual data set representing the shape and optical properties of the digital tooth model; determining a first comparison value from the actual data set; determining a second comparison value from the target data set; and determining a deviation based on the first and second comparison values. By comparing a difference at one pixel or a reduced number of pixels, rendering can be limited to those pixels, resulting in significant speed benefits. For the purpose of simplifying the comparison measurement, two-dimensional images of the natural tooth and the digital tooth model can be derived which have the same viewing angle and the comparison values are determined from the superimposition of the two-dimensional color images.

In a technically advantageous embodiment of the method, the target data set is scaled in such a way that an overlay with the actual data set in the same coordinate system is achieved or the actual data set is scaled in such a way that an overlay with the target data set in the same coordinate system is achieved. The scaling can be performed based on the shape from the actual data set and/or the target data set. This achieves, for example, the technical advantage that the comparison values can be determined easily and reliably.

In a further technically advantageous embodiment of the method, the deviation is determined based on several first and second comparison values at different positions of the coordinate system. For this purpose, several first and second comparison values can be determined at the respective positions of the coordinate system of the target data set and the actual data set. This achieves, for example, the technical advantage that the accuracy of the determined deviation is improved.

In a further technically advantageous embodiment of the method, the first and second comparison values are obtained from an area of the coordinate system. The area can be a rectangular or circular area of the coordinate system. In this way, deviations in predetermined areas of the surface can be determined and quantified. This has the technical advantage, for example, that certain image points can be combined to form areas, thus simplifying, and accelerating the color matching process, and that precise values for the deviation over an entire area can be determined.

In a further technically advantageous embodiment of the method, the first and second comparison values are obtained along a grid or along lines within the coordinate system. This achieves, for example, the technical advantage that comparison values can be determined from the entire area in just a few steps.

In a further technically advantageous embodiment of the method, the deviation is determined based on a Euclidean distance of the first and the second comparison values. This achieves, for example, the technical advantage that a standardized and precise measure of the deviation is obtained.

In a further technically advantageous embodiment of the method, an image noise of the target data set and/or the actual data set is reduced by a filter. This achieves, for example, the technical advantage that an image noise can be reduced, and larger areas can be compared better.

In a further technically advantageous embodiment of the method, the target data set and/or the actual data set comprises a two-dimensional image. This achieves, for example, the technical advantage that the deviation can be determined with little computational effort.

In a further technically advantageous embodiment of the method, the target data set and/or the actual data set comprises several two-dimensional images from several viewing angles. This achieves, for example, the technical advantage that the accuracy of the method is increased.

In a further technically advantageous embodiment of the method, the deviation is determined based on several first and second comparison values in different two-dimensional images. This achieves, for example, the technical advantage that the accuracy of the method is further improved.

In a further technically advantageous embodiment of the method, the target data set and/or the actual data set comprises a three-dimensional shape. This achieves, for example, the technical advantage that the deviation can be compared over the entire shape.

In a further technically advantageous embodiment of the method, the deviation is determined based on several first and second comparison values at the same positions on the surface of the three-dimensional mold. This achieves, for example, the technical advantage that the deviation can be determined over the entire tooth.

In a further technically advantageous embodiment of the method, the coordinate system is a two-dimensional or a three-dimensional coordinate system. This achieves, for example, the technical advantage that particularly suitable coordinate systems are used and the image points in the target and actual data set can be precisely referenced.

In a further technically advantageous embodiment of the method, the target data set is captured by means of an electronic camera or a 3D scanner. The electronic camera or the 3D scanner form a sensor for capturing the target data set. This achieves, for example, the technical advantage that the target data set can be obtained in a simple and fast manner.

According to a second aspect, the technical problem is solved by a computer device for comparing three-dimensional dental structures, comprising a sensor for acquiring a target data set based on a natural tooth, which is suitable for carrying out the method according to the first aspect. Thereby, the same technical advantages are achieved as by the method according to the first aspect. The computer device may include a computing unit with at least one algorithm that is configured to perform the method herein.

According to a third aspect, the technical task is solved by a computer program comprising instructions that cause the computer device according to the second aspect to perform the method according to the first aspect. Thereby, the same technical advantages are achieved as by the method according to the first aspect. The computer program product may include program code which is stored on a non-transitory machine-readable medium, the machine-readable medium including computer instructions executable by a processor, which computer instructions cause the processor to perform the method herein.

BRIEF DESCRIPTION OF THE DRAWINGS

Examples of embodiments of the invention are shown in the drawings and are described in more detail below.

DETAILED DESCRIPTION

Figure 1:
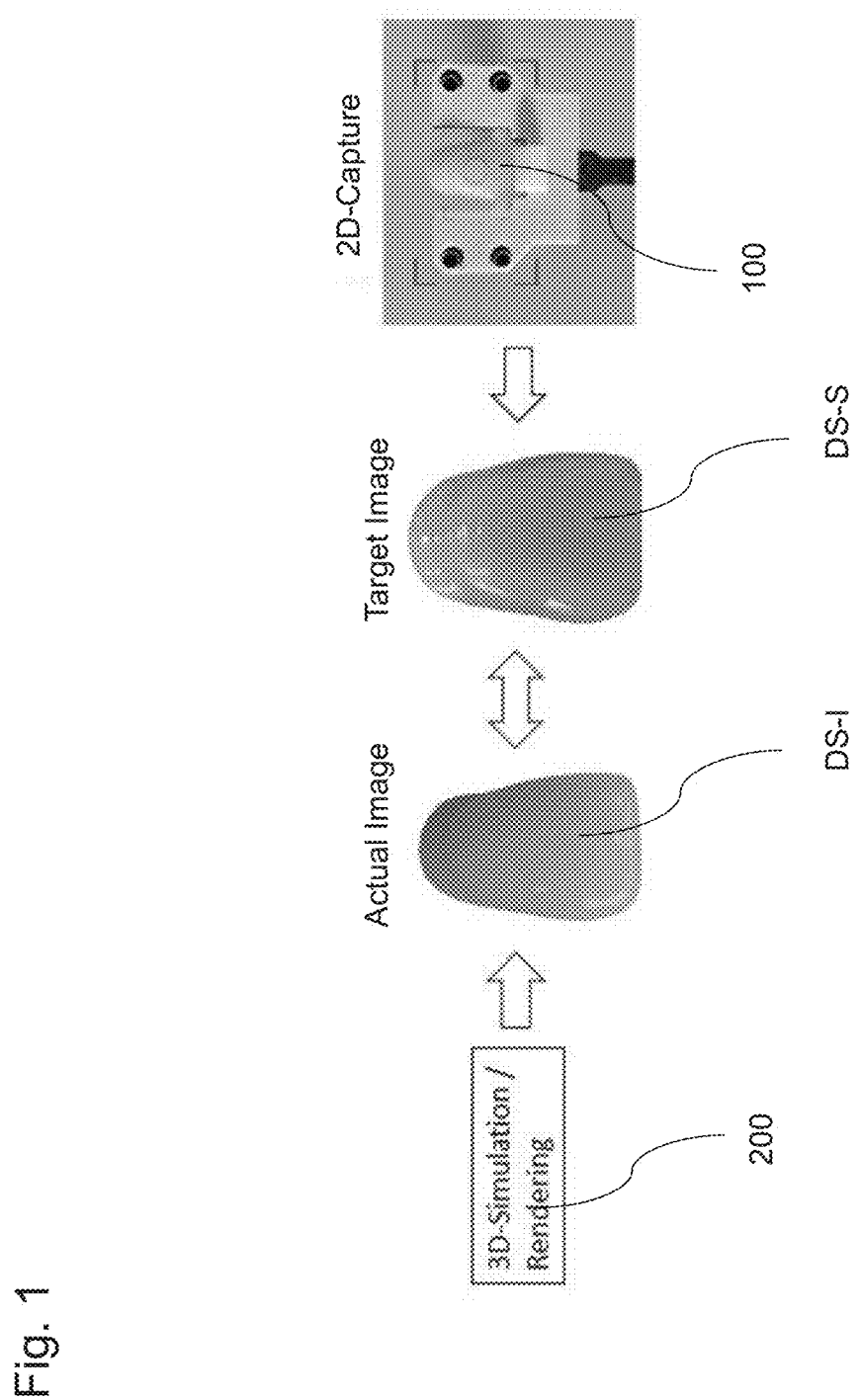
FIG. 1 a schematic view of an acquiring of a target data set and an actual data set.

FIG. 1 shows a schematic view of an acquiring of a target data set DS-S and an actual data set DS-I. The target data set DS-S represents the shape and optical properties of a natural tooth 100 in two or three dimensions. The target data set DS-S is captured, for example, by an electronic calibrated camera 103 that captures the visible areas of a patient's tooth 100. These normalized color values of the camera in the target data set DS-S later form the common basis for a target/actual comparison. If a camera is used, the image in RAW format is preferred, through which the direct measured values of the sensor are used. This format can then be transformed into the L*a*b* color space. A target image can then be determined from the target data set DS-S, to which the external appearance of the dental restoration is adapted.

The real tooth can be captured by means of an intraoral scanner. In this case, the color information is linked together with a three-dimensional shape in the target data set DS-S. Target images of the tooth can then be derived from the three-dimensional target data set DS-S. However, the target data set DS-S can also comprise one or more images.

The digital dental model 200, on the other hand, reproduces an outer shape and an inner structure of a dental restoration based on a planning design. The inner structure of the dental restoration can comprise several layers of different restoration materials for the abutment. For example, spatial regions for an incisal edge of the dental restoration and a dentin core within the dental restoration can be defined. In addition, a preparation of the remaining natural tooth and a luting layer can also be considered, such as a cement or adhesive. The physical optical parameters of the assigned restoration materials are known.

The entire structure of the digital tooth model 200 is transferred to a rendering/simulation software including the assignment of the physical-optical material properties to the various spatial areas, layers or subvolumes. From this, the rendering/simulation software now generates an actual data set DS-I, from which actual images with normalized color and translucency values can be derived. The actual data set DS-I thus represents the shape and optical properties of a digital tooth model 200 for a planned dental restoration. However, the actual data set DS-I can also comprise one or more images.

Rendering is performed using a physically correct simulation of the interaction of light and the planned dental restoration 100 and the restoration materials used. The known optical parameters of the individual restoration materials are used to generate a computer-aided view of the dental restoration 100.

For this purpose, existing natural tooth material can also be considered, such as a residual tooth on which the dental restoration 100 is to be placed. During rendering, the optical impression of the subsequent dental restoration 100 is calculated for the specified internal structure and the selected restoration materials. For rendering, a computer-aided calculation of reflection, transmission, and absorption values in the visible range at at least three wavelengths can be performed.

The target data set DS-S and the actual data set DS-I can then be compared with each other to determine deviations between the planned dental restoration and the corresponding natural tooth.

Figure 2:
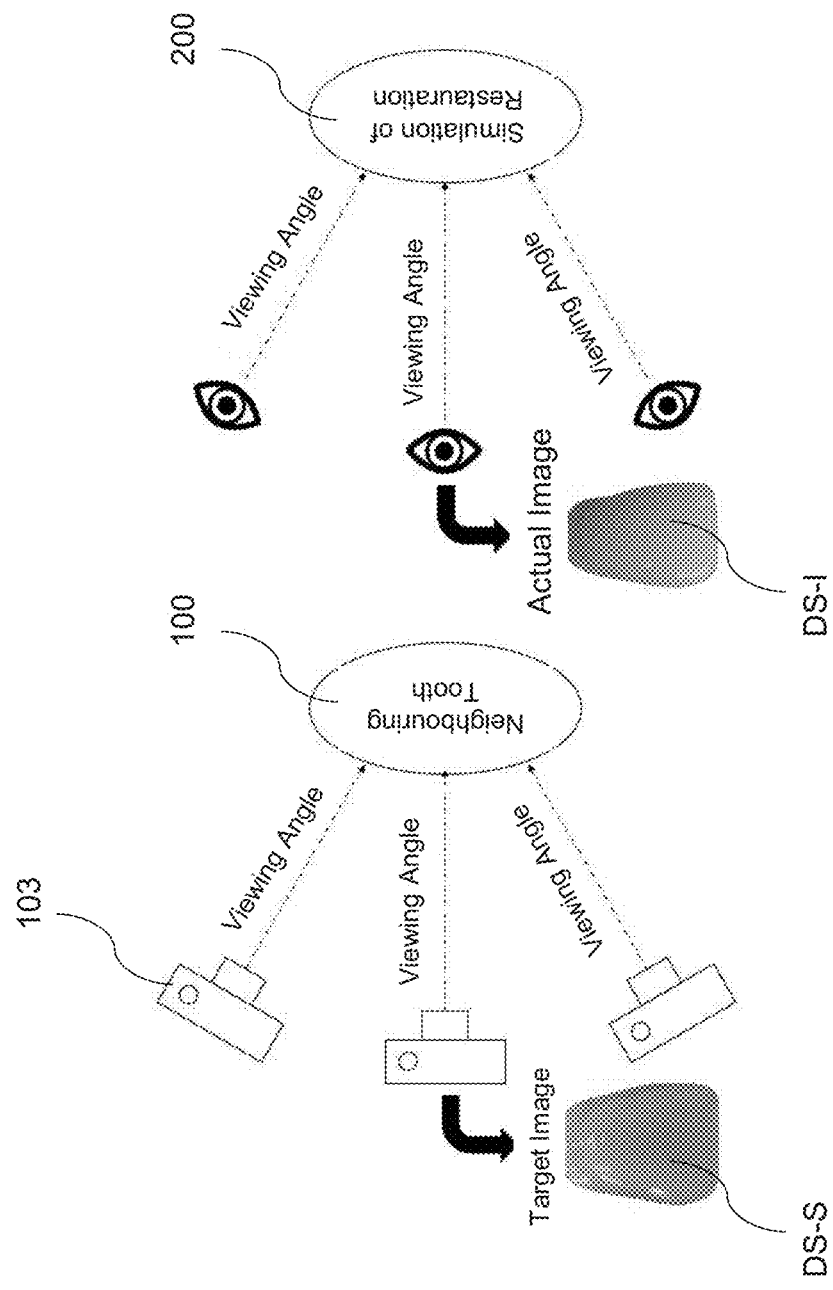
FIG. 2 a schematic view of an acquiring of the target data set and an actual data set from multiple angles.

FIG. 2 shows a schematic view of an acquiring of a target data set DS-S and an actual data set DS-I from several angles.

The target data set DS-S can be derived from color images taken by an electronic camera 103 of an adjacent tooth 100 from different viewing angles. It is advantageous to use a camera 103 with known spectral sensitivity to be able to exclude unknown device-specific image data processing as a source of error.

For the acquiring of the target data set DS-S, it is also advantageous if an illumination situation of the color images is precisely known. For this purpose, a single light source with a unique spectrum and a unique light direction can be used. This can be determined using a mirror ball to detect the reflections. In addition, a ring flash or tong flash can be used in a dark room.

The lighting conditions at the time of color acquiring are known, for example, by parallel acquiring of a reference surface (gray chart) or use of a defined light source (spectrum, intensity, and arrangement) to obtain approximately normalized color values. Together with the reference surface, information on a translucency of the tooth can also be obtained.

Prior calibration of the camera 103 and use of a reference may also be beneficial for calculating the distance during color acquiring.

A color image can be taken in frontal viewing at a viewing angle of 0° in the direction of the patient's face or mouth. In addition, a color image can be acquired from viewing angles between −90° and +90° to the orthogonal of a labial tooth surface or between −45° and +45° to the orthogonal of a labial tooth surface.

Ideally, the actual images of the actual data set DS-I are derived from the digital tooth model 200 under the same viewing angles from which the target images were also acquired. To be able to perform a standardized comparison of the color and translucency values of the actual and target images, the reference surface or the reference body can also be rendered so that a plausibility check can be performed.

In this case, the comparison is made based on the two-dimensional images that have been captured and derived from the different viewing angles. The more color images are obtained as target images from different viewing angles and compared with the respective actual images, the more accurate the determination of the deviation within the framework of the target/actual comparison will be afterwards.

Figure 3:
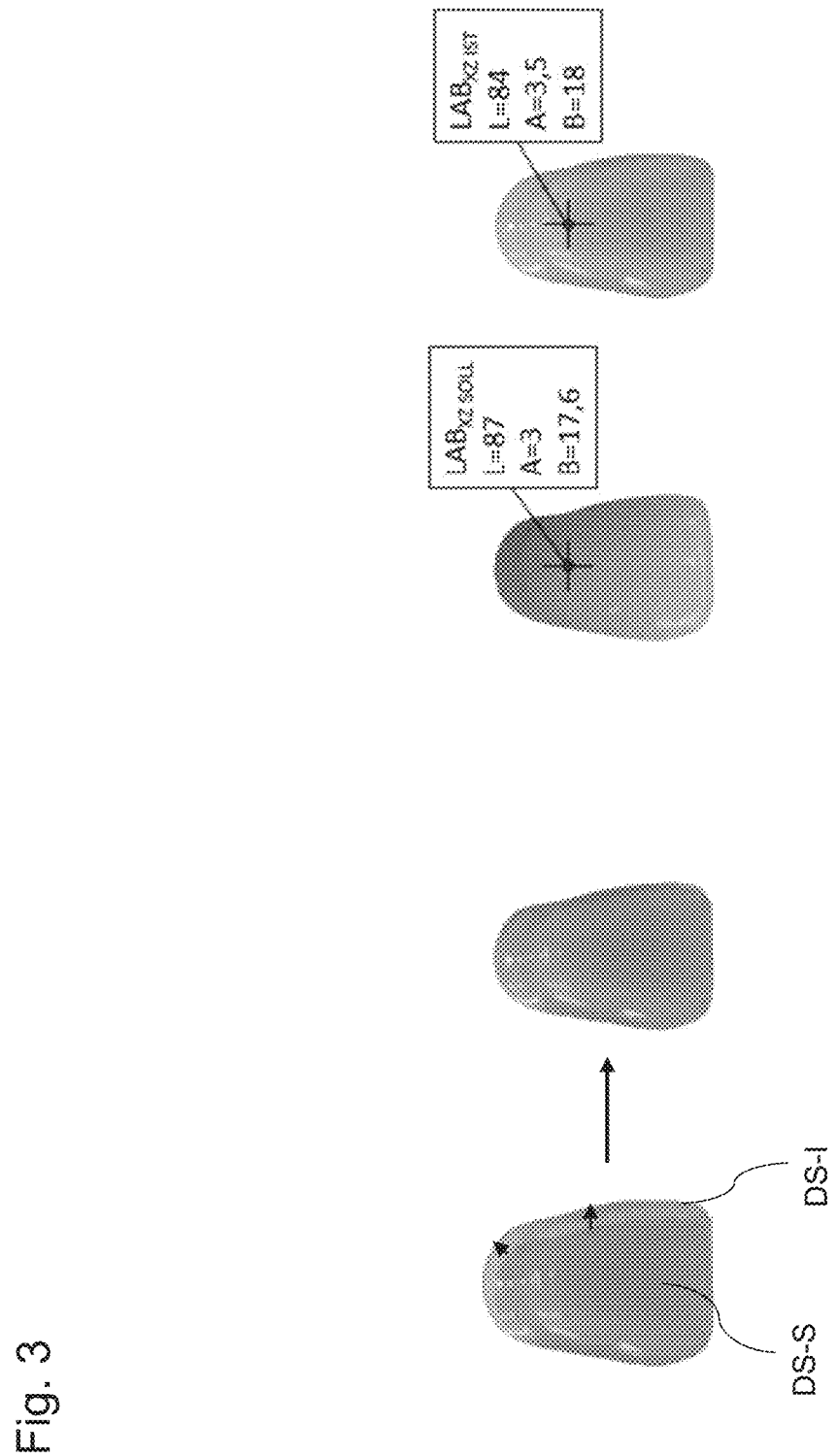
FIG. 3 a schematic view of a scaling of the target data set to the actual data set.

FIG. 3 shows a schematic view of a scaling of the target data set DS-S to the actual data set DS-I. In this case, an image of the target data set DS-S is stretched or compressed (scaled) in the transverse and longitudinal directions so that the respective shapes of the tooth correspond. The target data set DS-S and the actual data set DS-I then lie in a common coordinate system.

Then a position is selected from the coordinate system and the color values of the target data set DS-S and the actual data set DS-I are determined at this position. In this case, a color value $L_I^* a_I^* b_I^*$ is obtained for the actual data set and a color value $L_S^* a_S^* b_S^*$ for the target data set in the L*a*b color space.

The Euclidean deviation $\Delta E_{S,I}$ between the target data set DS-S and the actual data set DS-I can be calculated by determining the differences in the color values $L_I^* a_I^* b_I^*$ and $L_S^* a_S^* b_S^*$. The comparison can be made at pixel level as the smallest resolution.

$$\Delta E_{S,I} = \sqrt{(L^*_S - L^*_I)^2 + (a^*_S - a^*_I)^2 + (b^*_S - b^*_I)^2}$$

The deviation determined in this way can then be used to determine an optimized material allocation to a multilayer dental restoration to plan and subsequently manufacture a highly esthetic, patient-specific restoration.

Figure 4:
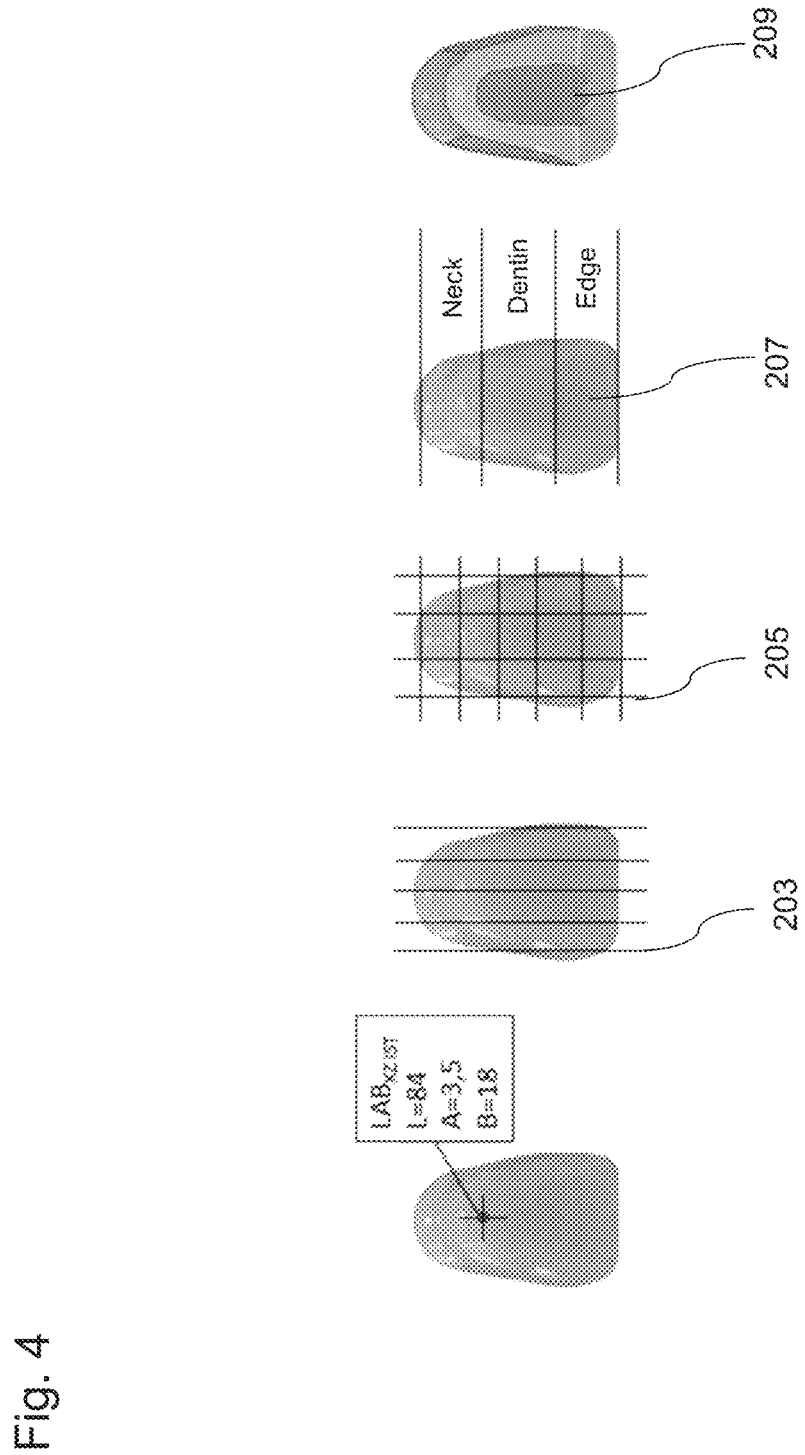
FIG. 4 a schematic view of several methods for calculating a deviation from successively scaled data sets.

FIG. 4 shows a schematic view of several methods for calculating a deviation from successively scaled data sets DS-I and DS-S.

In a first embodiment, a single position within the coordinate system is determined and the deviation is calculated from the two color values of the data sets DS-I and DS-S from one point. This calculation can be repeated for further points.

In a second embodiment, the deviation is determined along one or more lines 203. For this purpose, the deviations at pixel level along the line 203 are determined and summed up to a total value. This can increase the accuracy of the method.

In a third embodiment, the deviation is determined along a grid 205 with several horizontal and vertical lines. For this purpose, the deviations on pixel level along the horizontal and vertical lines 203 are determined and also summed up to a total value. In this way, the deviation in different directions can be determined and the accuracy of the method can be increased again.

In a fourth embodiment, the deviation in certain areas 207 is obtained. For this purpose, the individual deviations at pixel level from a specific area are added up to a value. In this way, for example, deviations for the tooth neck, the dentin area and the incisal edge can be determined. The individual deviations can be weighted individually so that particularly relevant areas have a higher significance for the overall value.

In a fifth embodiment, the deviation is determined from the areas 209 that can be assigned to a specific color scheme. For this purpose, the individual deviations at pixel level from a specific area are added up to a value. In this way, for example, deviations can be determined for individual color areas. In this case, too, the individual deviations can be weighted individually so that particularly relevant areas have a higher significance for the overall value.

Figure 5:
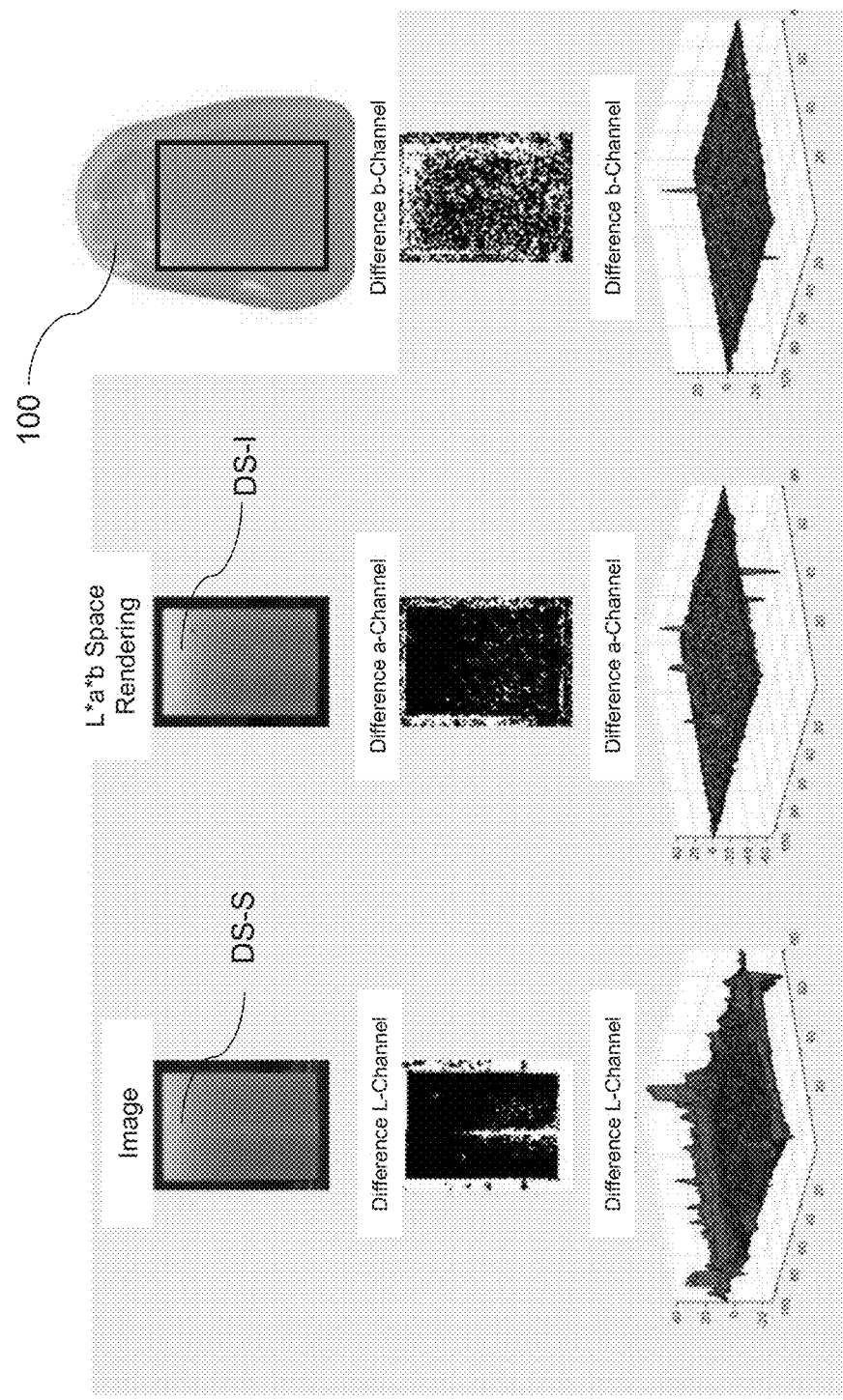
FIG. 5 a view of different difference values determined over a planar area.

FIG. 5 shows a view of different difference values between the target data set DS-S and the actual data set DS-I, which have been determined at pixel level over a two-dimensional area. Differences occur in each of the individual color values in L*a*b* space, from which a total deviation can be calculated.

Figure 6:
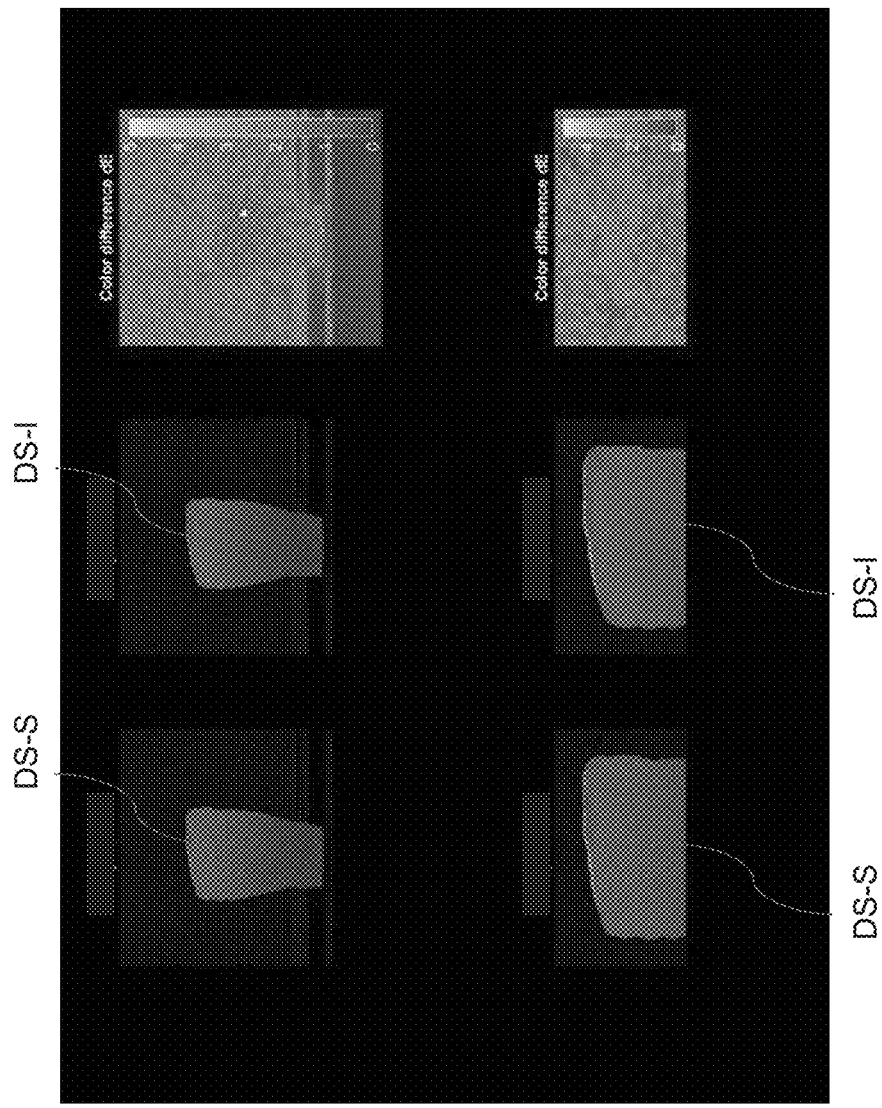
FIG. 6 color differences between a target data set and an actual data set.
Figure 7:
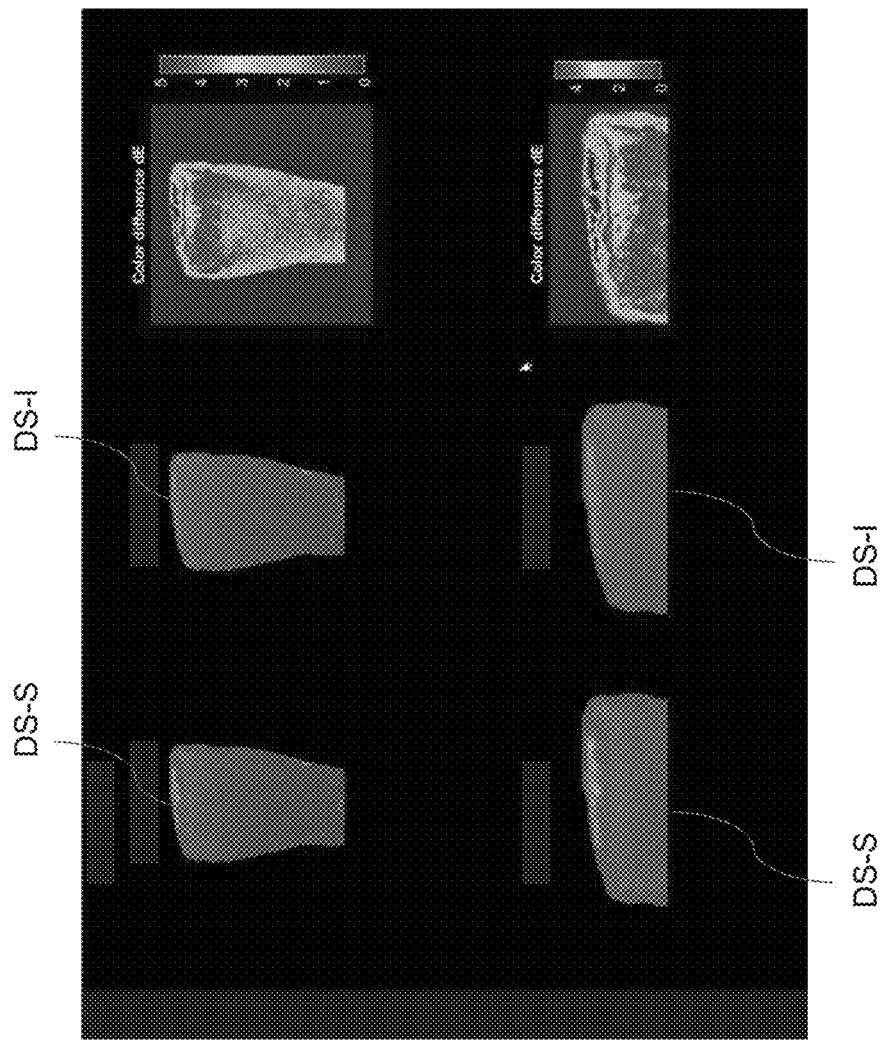
FIG. 7 color differences between a further target data set and a further actual data set.

FIG. 6 and FIG. 7 show color differences between different target data sets DS-S and actual data sets DS-I. The desired color distribution and limit values can be determined from the target data set, such as the lightest and darkest colors and the corresponding LAB values. This has the advantage that the initial material assignment to the different volume areas of the digital tooth model or the digital restoration can be assigned from this and the first target image is derived.

From the distribution of the deviation values in the image, a three-dimensional change in the internal architecture of the tooth model 200 and/or a material allocation to the different spatial areas can be determined.

Figure 8:
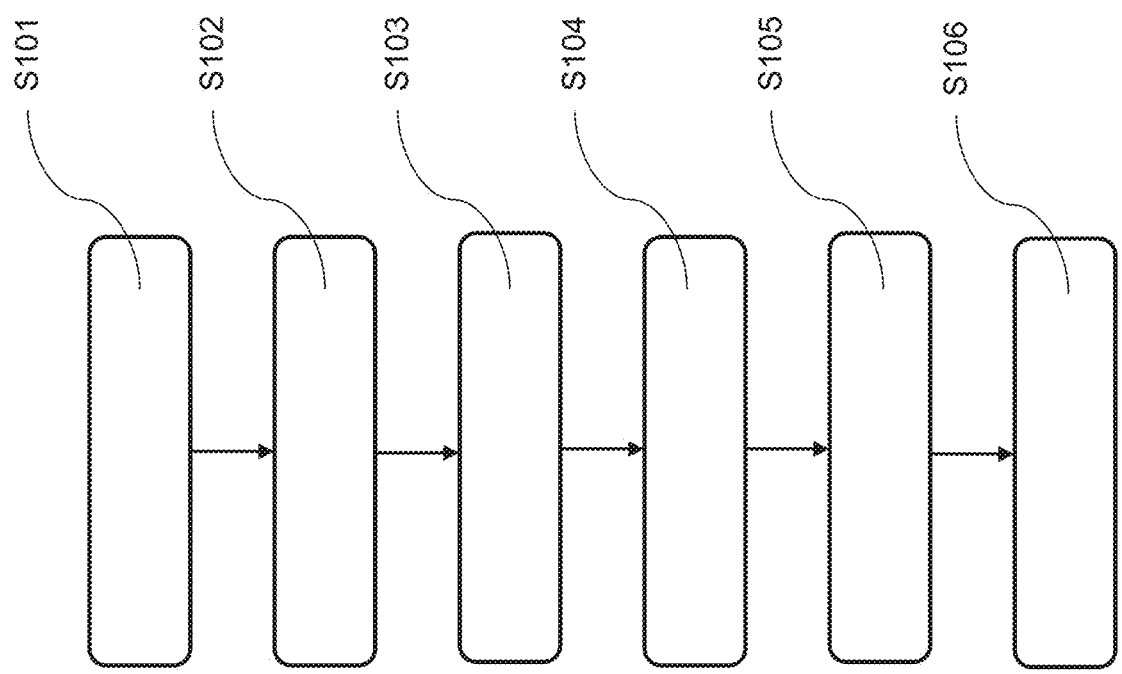
FIG. 8 a block diagram of a method for comparing three-dimensional dental structures.

FIG. 8 shows a block diagram of a method for comparing three-dimensional dental structures. In step S101, the target data set DS-S is acquired, which represents the shape and optical properties of a natural tooth. In step S102, the digital tooth model 200 is rendered to generate an actual data set DS-I that represents the shape and optical properties of the digital tooth model 200. In step S103, the actual data set DS-I and/or the target data set DS-S are scaled to a common coordinate system based on the respective shape. In step S104, a first comparison value is determined from the scaled actual data set DS-I at a position of the coordinate system. In step S105, a second comparison value is determined from the scaled target data set DS-S at the same position of the coordinate system. Subsequently, in step S106, a deviation is determined based on the first and the second comparison value.

However, the actual data set DS-I and/or the target data set DS-S can also be superimposed or evaluated in other ways to obtain the first and second comparison values. The first comparison value can be obtained at a common position in the superposition of the actual and target data set DS-I and DS-S, such as a color value at that position. The second comparison value can also be determined at a common position in the overlay of the actual and target data set DS-I and DS-S.

The same coordinate system is superimposed on the actual image based on the actual data set DS-I and the target image based on the target data set DS-S. The actual image of the tooth can be scaled to match the actual image of the rendering. In this process, the target image of the tooth can be scaled to match the actual image of the rendering to achieve maximum superimposition and matching. The LAB values are compared from image points from common image coordinates and the deviation $\Delta E_{S,I}$ is determined.

Measured values from the center or the area centroid of the target and actual images can also be used as the first and second comparison values. In this case, scaling to a common coordinate system can be dispensed with. It is also possible to use maximum values or minimum values from the actual data set DS-I and the target data set DS-S as first and second comparison values.

Points, measuring lines, grids, measuring fields (tiles), areas such as the tooth neck, dentin, incisal edge, or color zones that extend over similar color ranges can be used for comparison. The smallest unit and thus the most accurate procedure is the comparison at pixel level.

Subsequently, a dental restoration can be manufactured based on the actual data set that has less than a predetermined deviation from the target data set. For this purpose, a manufacturing device can be used, such as a 3D printer, which prints the dental restoration 100 with the different restoration materials. However, in general, other manufacturing devices that can produce the dental restoration with the different restoration materials can also be used.

The method may use a computer device to perform the calculation steps and then fabricate the dental restoration 100 using the fabrication device. The computer device may additionally comprise a sensor for acquiring a target data set. To this end, the computer device executes a computer program comprising instructions that cause the computer device to perform the required procedural steps. The computer device comprises a processor and a digital memory in which the data sets and a computer program is stored that executes the method steps and suitably controls the manufacturing device.

By means of the method, a color registration of a real three-dimensional dental structure with the color appearance of a virtual three-dimensional dental structure can be performed by comparing both structures by superimposing (two-dimensional) color images including the translucency values of the real and virtual three-dimensional structure.

All features explained and shown in connection with individual embodiments of the invention may be provided in different combinations in the subject-matter of the invention to simultaneously realize their beneficial effects.

All method steps can be implemented by devices which are suitable for executing the respective method step. All functions that are executed by the features in question can be a method step of a process.

In some embodiments, the innovations may be implemented in diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power. A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown in the figures.

REFERENCE LIST

100 Tooth
103 Camera
200 Tooth model
203 Line
205 Grid
207 Area
209 Area
DS-I Actual dataset
DS-S Target data set

The invention claimed is:

1. A method for comparing three-dimensional dental structures, comprising the steps:
    acquiring (S101) a target data set (DS-S) representing the shape and optical properties of a natural tooth (100);
    rendering (S102) of a digital tooth model (200) to generate an actual data set (DS-I) representing the shape and optical properties of the digital tooth model (200);
    determining (S104) a first comparison value from the actual data set (DS-I);
    determining (S105) a second comparison value from the target data set (DS-S);
    determining (S106) a deviation ($\Delta E_{S,I}$) based on the first and second comparison values;
    wherein the target data set (DS-S) is scaled such that an overlay with the actual data set (DS-I) in the same coordinate system is achieved or the actual data set (DS-I) is scaled such that an overlay with the target data set (DS-I) in the same coordinate system is achieved and the first and second comparison values are obtained from a region of the coordinate system; and
    using the determined deviation to manufacture a dental restoration.

2. The method according to claim 1, wherein the first and second comparison values are obtained along a grid or along lines within the coordinate system.

3. The method according to claim 1, wherein the deviation ($\Delta E_{S,I}$) is determined based on a Euclidean distance of the first and the second comparison values.

4. The method according to claim 1, wherein an image noise of the target data set (DS-S) and/or the actual data set (DS-I) is reduced by a filter.

5. The method according to claim 1, wherein the target data set (DS-S) and/or the actual data set (DS-I) comprises a two-dimensional image.

6. The method according to claim 5, wherein the target data set (DS-S) and/or the actual data set (DS-I) comprises several two-dimensional images from several viewing angles.

7. The method according to claim 6, wherein the deviation ($\Delta E_{S,I}$) is determined based on a plurality of first and second comparison values in different two-dimensional images.

8. The method according to claim 1, wherein the target data set (DS-S) and/or the actual data set (DS-I) comprises a three-dimensional shape.

9. The method according to claim 8, wherein the deviation ($\Delta E_{S,I}$) is determined based on a plurality of first and second comparison values at the same respective positions on the surface of the three-dimensional shape.

10. The method according to claim 1, wherein the coordinate system is a two-dimensional or a three-dimensional coordinate system.

11. The method according to claim 1, wherein the target data set is acquired by means of an electronic camera and/or a 3D scanner.

12. A computer device for comparing three-dimensional dental structures, comprising a sensor for acquiring a target data set based on a natural tooth, which is suitable for carrying out a method comprising
    acquiring (S101) a target data set (DS-S) representing the shape and optical properties of a natural tooth (100);
    rendering (S102) of a digital tooth model (200) to generate an actual data set (DS-I) representing the shape and optical properties of the digital tooth model (200);
    determining (S104) a first comparison value from the actual data set (DS-I);
    determining (S105) a second comparison value from the target data set (DS-S);
    determining (S106) a deviation ($\Delta E_{S,I}$) based on the first and second comparison values;
    wherein the target data set (DS-S) is scaled such that an overlay with the actual data set (DS-I) in the same coordinate system is achieved or the actual data set (DS-I) is scaled such that an overlay with the target data set (DS-I) in the same coordinate system is achieved and the first and second comparison values are obtained from a region of the coordinate system; and
    using the determined deviation to manufacture a dental restoration.

13. A computer device comparing three-dimensional dental structures, comprising a sensor for acquiring a target data set based on a natural tooth and a computing unit with at least one algorithm that is configured to perform a method comprising
    acquiring (S101) a target data set (DS-S) representing the shape and optical properties of a natural tooth (100);
    rendering (S102) of a digital tooth model (200) to generate an actual data set (DS-I) representing the shape and optical properties of the digital tooth model (200);
    determining (S104) a first comparison value from the actual data set (DS-I);
    determining (S105) a second comparison value from the target data set (DS-S);
    determining (S106) a deviation ($\Delta E_{S,I}$) based on the first and second comparison values;
    wherein the target data set (DS-S) is scaled such that an overlay with the actual data set (DS-I) in the same coordinate system is achieved or the actual data set (DS-I) is scaled such that an overlay with the target data set (DS-I) in the same coordinate system is achieved and the first and second comparison values are obtained from a region of the coordinate system; and
    using the determined deviation to manufacture a dental restoration.

14. A computer program product comprising program code which is stored on a non-transitory machine-readable medium, the machine-readable medium comprising computer instructions executable by a computer device comprising a sensor for acquiring a target data set based on a natural tooth, to perform a method comprising
    acquiring (S101) a target data set (DS-S) representing the shape and optical properties of a natural tooth (100);
    rendering (S102) of a digital tooth model (200) to generate an actual data set (DS-I) representing the shape and optical properties of the digital tooth model (200);
    determining (S104) a first comparison value from the actual data set (DS-I);
    determining (S105) a second comparison value from the target data set (DS-S);
    determining (S106) a deviation ($\Delta E_{S,I}$) based on the first and second comparison values;
    wherein the target data set (DS-S) is scaled such that an overlay with the actual data set (DS-I) in the same coordinate system is achieved or the actual data set (DS-I) is scaled such that an overlay with the target data set (DS-I) in the same coordinate system is achieved and the first and second comparison values are obtained from a region of the coordinate system; and
    using the determined deviation to manufacture a dental restoration.

15. A computer program product comprising program code which is stored on a non-transitory machine-readable medium, the machine-readable medium comprising computer instructions executable by a processor, which computer instructions cause the processor to perform a method comprising
- acquiring (S101) a target data set (DS-S) representing the shape and optical properties of a natural tooth (100);
- rendering (S102) of a digital tooth model (200) to generate an actual data set (DS-I) representing the shape and optical properties of the digital tooth model (200);
- determining (S104) a first comparison value from the actual data set (DS-I);
- determining (S105) a second comparison value from the target data set (DS-S);
- determining (S106) a deviation ($\Delta E_{S,I}$) based on the first and second comparison values;
- wherein the target data set (DS-S) is scaled such that an overlay with the actual data set (DS-I) in the same coordinate system is achieved or the actual data set (DS-I) is scaled such that an overlay with the target data set (DS-I) in the same coordinate system is achieved and the first and second comparison values are obtained from a region of the coordinate system; and
- using the determined deviation to manufacture a dental restoration.

* * * * *